United States Patent
Tomioka et al.

(10) Patent No.: US 12,246,710 B2
(45) Date of Patent: Mar. 11, 2025

(54) PATH GENERATION APPARATUS AND PATH GENERATION METHOD

(71) Applicant: Honda Motor Co., Ltd., Tokyo (JP)

(72) Inventors: Kazuki Tomioka, Tokyo (JP); Yasuhiko Tomokuni, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 18/098,692

(22) Filed: Jan. 18, 2023

(65) Prior Publication Data
US 2023/0234582 A1 Jul. 27, 2023

(30) Foreign Application Priority Data

Jan. 24, 2022 (JP) .................................. 2022-008735

(51) Int. Cl.
*B60W 30/12* (2020.01)
*B60W 30/16* (2020.01)
(Continued)

(52) U.S. Cl.
CPC ............ *B60W 30/12* (2013.01); *B60W 30/16* (2013.01); *B60W 30/18163* (2013.01);
(Continued)

(58) Field of Classification Search
CPC .................. B60W 30/12; B60W 30/16; B60W 30/18163; B60W 40/072; B60W 40/105;
(Continued)

(56) References Cited

U.S. PATENT DOCUMENTS

| 5,521,579 A | * | 5/1996 | Bernhard | ........ B60W 30/18163 340/438 |
| 6,032,097 A | * | 2/2000 | Iihoshi | ................ G05D 1/0293 340/436 |

(Continued)

FOREIGN PATENT DOCUMENTS

| JP | 2007091025 A | 4/2007 |
| JP | 2018181209 A | 11/2018 |
| JP | 2019086038 A | 6/2019 |

OTHER PUBLICATIONS

Japanese office action; Application 2022-008735; Dec. 5, 2023.

*Primary Examiner* — Phutthiwat Wongwian
*Assistant Examiner* — Brian R Kirby
(74) *Attorney, Agent, or Firm* — Duft & Bornsen, PC

(57) ABSTRACT

Path generation apparatus configured to generate target travel path of own vehicle traveling in travel lane, includes: external sensor mounted on own vehicle and configured to detect external situation centered on advancing direction of own vehicle; vehicle speed sensor configured to detect travel speed of own vehicle; and electronic control unit including processor and memory coupled to processor. Electronic control unit is configured to perform: setting target passing point on travel lane based on external situation; and generating target travel path from current location point of own vehicle to target passing point. Setting target passing point includes setting target passing point after predetermined time period when travel speed is equal to or higher than predetermined value, while setting target passing point to predetermined distance ahead from current location point when travel speed is lower than predetermined value.

12 Claims, 8 Drawing Sheets

(51) Int. Cl.
   *B60W 30/18*   (2012.01)
   *B60W 40/072*  (2012.01)
   *B60W 40/105*  (2012.01)
(52) U.S. Cl.
   CPC ........ *B60W 40/072* (2013.01); *B60W 40/105* (2013.01); *B60W 2420/403* (2013.01); *B60W 2420/408* (2024.01); *B60W 2552/30* (2020.02); *B60W 2554/802* (2020.02)
(58) Field of Classification Search
   CPC ..... B60W 2420/403; B60W 2420/408; B60W 2552/30; B60W 2554/802; B60W 2520/10; G08G 1/096805; G08G 1/052; G08G 1/08; G08G 1/096725
   USPC .......................................... 701/96, 301, 23
   See application file for complete search history.

(56) References Cited

U.S. PATENT DOCUMENTS

| | | | |
|---|---|---|---|
| 9,499,197 B2 * | 11/2016 | Tan | B62D 6/00 |
| 2004/0193374 A1 * | 9/2004 | Hac | G08G 1/166 |
| | | | 701/301 |
| 2007/0069873 A1 * | 3/2007 | Kudo | B62D 15/029 |
| | | | 340/435 |
| 2010/0082195 A1 * | 4/2010 | Lee | B62D 15/0255 |
| | | | 701/25 |
| 2011/0144859 A1 * | 6/2011 | Suk | G06V 20/588 |
| | | | 382/104 |
| 2016/0107682 A1 * | 4/2016 | Tan | B60W 30/18163 |
| | | | 701/41 |
| 2016/0194003 A1 * | 7/2016 | Torii | B60W 60/0053 |
| | | | 701/23 |
| 2016/0313133 A1 * | 10/2016 | Zeng | B60W 60/0011 |
| 2017/0259819 A1 * | 9/2017 | Takeda | B60W 30/18163 |
| 2018/0210453 A1 * | 7/2018 | Sato | G01C 21/34 |
| 2018/0345969 A1 * | 12/2018 | Yasui | B60W 50/04 |
| 2018/0345991 A1 * | 12/2018 | Mimura | B60W 50/14 |
| 2018/0354513 A1 * | 12/2018 | Moshchuk | B62D 6/002 |
| 2019/0128408 A1 * | 5/2019 | Kishi | F16H 61/0213 |
| 2021/0291868 A1 * | 9/2021 | Okuda | B60W 60/0015 |
| 2022/0126824 A1 * | 4/2022 | Kato | B60W 10/20 |
| 2022/0204054 A1 * | 6/2022 | Taniguchi | G08G 1/167 |
| 2023/0234582 A1 * | 7/2023 | Tomioka | B60W 40/105 |
| | | | 701/41 |

* cited by examiner

PATH GENERATION APPARATUS AND PATH GENERATION METHOD

CROSS-REFERENCE TO RELATED APPLICATION

This application is based upon and claims the benefit of priority from Japanese Patent Application No. 2022-008735 filed on Jan. 24, 2022, the content of which is incorporated herein by reference.

BACKGROUND OF THE INVENTION

Field of the Invention

This invention relates to a path generation apparatus and a path generation method configured to generate a target travel path of an own vehicle having an automatic driving function or a driving-assistance function.

Description of the Related Art

A device that generates a target travel path of a vehicle for driving automatically is conventionally known (for example, see JP2019-086038A). In the device described in JP2019-086038A, a target passing point through which an own vehicle is to pass after a predetermined time is set, and a passing point for every unit time is also set between a current location point and the target passing point, so that a target travel path is generated by sequentially connecting the passing points.

As vehicles each having an automatic driving function and a driving-assistance function become widely used, the safety and convenience of the entire traffic society are improved, and a sustainable transportation system is achievable. In addition, as the efficiency and smoothness of transportation are improved, $CO_2$ emission amounts are reduced, and loads on the environment can be reduced.

As in the device described in JP2019-086038A, however, in a case where the target travel path to the target passing point after a predetermined time from the current location point is generated, if the vehicle speed decreases due to traffic congestion or the like, the target passing points are too close to the current location point, and it becomes difficult to generate an appropriate target travel path.

SUMMARY OF THE INVENTION

An aspect of the present invention is a path generation apparatus configured to generate a target travel path of an own vehicle traveling in a travel lane, including: an external sensor mounted on the own vehicle and configured to detect an external situation centered on an advancing direction of the own vehicle; a vehicle speed sensor configured to detect a travel speed of the own vehicle; and an electronic control unit including a processor and a memory coupled to the processor. The electronic control unit is configured to perform: setting a target passing point on the travel lane based on the external situation detected by the external sensor; and generating the target travel path from a current location point of the own vehicle to the target passing point. The setting the target passing point includes setting the target passing point after a predetermined time period when the travel speed detected by the vehicle speed sensor is equal to or higher than a predetermined value, while setting the target passing point to a predetermined distance ahead from the current location point when the travel speed detected by the vehicle speed sensor is lower than the predetermined value.

Another aspect of the present invention is a path generation method configured to generate a target travel path of an own vehicle traveling in a travel lane, including: setting a target passing point on the travel lane based on an external situation centered on an advancing direction of the own vehicle detected by an external sensor mounted on the own vehicle; and generating the target travel path from a current location point of the own vehicle to the target passing point. The setting the target passing point includes setting the target passing point after a predetermined time period when a travel speed of the own vehicle detected by a vehicle speed sensor is equal to or higher than a predetermined value, while setting the target passing point to a predetermined distance ahead from the current location point when the travel speed detected by the vehicle speed sensor is lower than the predetermined value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 9B. A path generation apparatus according to an embodiment of the present invention is applied to an own vehicle having a driving-assistance function of controlling a travel actuator to conduct driving assistance for a driver of the own vehicle or to automatically drive the own vehicle, and generates a target travel path (target travel path) of the own vehicle. The "driving assistance" in the present embodiment includes driving assistance for assisting driver's driving operations and automatic driving for automatically driving a vehicle without depending on the driver's driving operations, and corresponds to levels 1 to 4 of driving automation defined by SAE, and the "automatic driving" corresponds to the level 5 driving automation.

Figure 1:
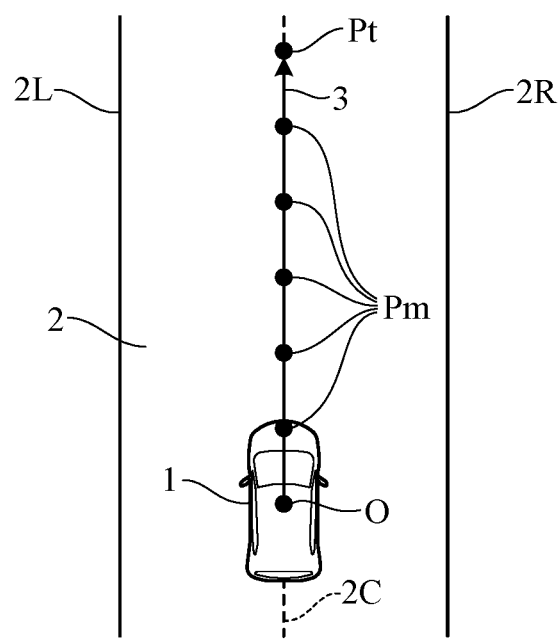
FIG. 1 is a diagram for describing a target travel path.

FIG. 1 is a diagram for describing a target travel path, and illustrates an example of a traveling scene in which an own vehicle 1 travels along a center line 2C of a travel lane 2. A target travel path 3 is generated, based on recognition results of the travel lane 2 on a forward side of the vehicle, a neighboring vehicle 4, and the like by a camera or the like, and the own vehicle 1 is controlled to travel along the target travel path 3 that has been generated. In the example of FIG. 1, the target travel path 3 is generated along the center line 2C of the travel lane 2, based on the recognition results of the left and right division lines 2L and 2R, which define the travel lane 2.

The target travel path 3 is generated by connecting, in the order of time, passing points Pm at every unit time Δt (for example, 0.1 seconds) from the current location point O of the own vehicle 1 to a target passing point Pt that the own vehicle 1 is to pass after a predetermined prediction time tp (for example, approximately 3.1 seconds) from the current time. The target travel path 3 is updated at a predetermined cycle.

Figure 2A:
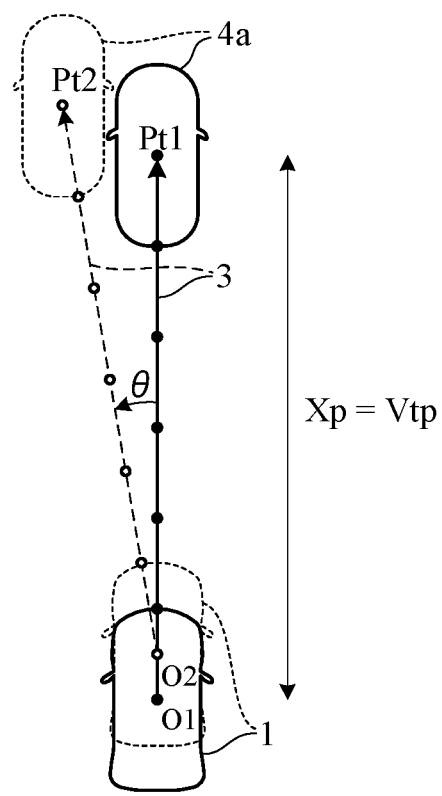
FIG. 2A is a diagram for describing change of the target travel path to be generated during traveling at high speed.
Figure 2B:
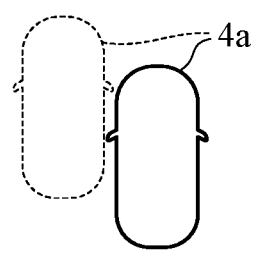
FIG. 2B is a diagram for describing change of the target travel path to be generated during traveling at low speed.
Figure 2B:
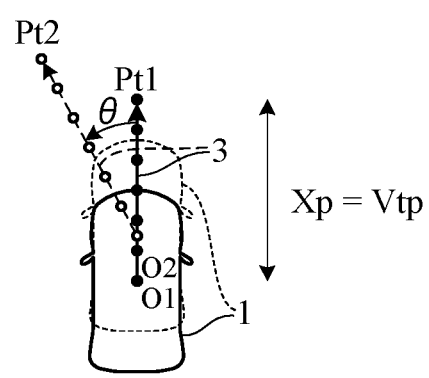
Figure 3A:
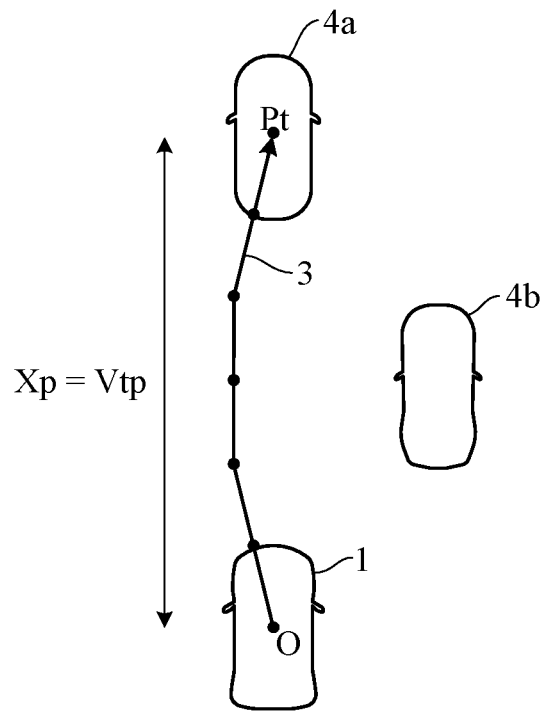
FIG. 3A is a diagram for describing the target travel path to be generated during traveling at high speed.
Figure 3B:
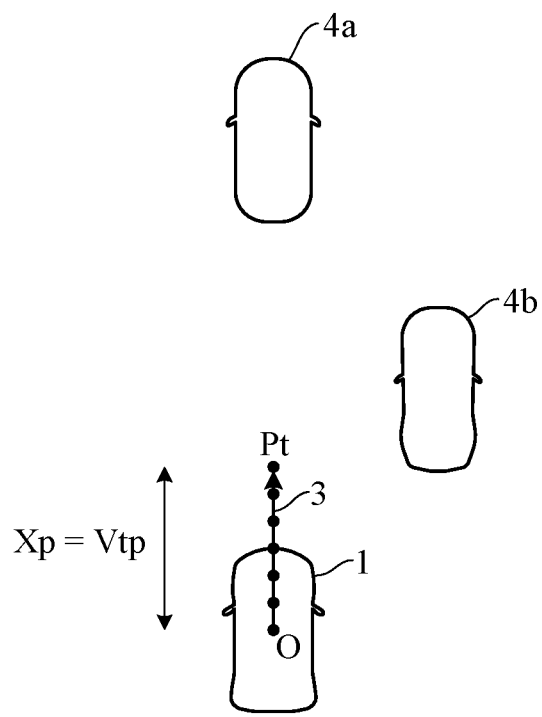
FIG. 3B is a diagram for describing the target travel path to be generated during traveling at low speed.

FIG. 2A is a diagram for describing a change of the target travel path 3 to be generated during traveling at high speed, and FIG. 2B is a diagram for describing a change of the target travel path 3 to be generated during traveling at low speed. In addition, FIG. 3A is a diagram for describing the target travel path 3 to be generated during traveling at high speed, and FIG. 3B is a diagram for describing the target travel path 3 to be generated during traveling at low speed.

As illustrated in FIGS. 2A to 3B, it is assumed that the prediction time tp is constant, a prediction distance Xp to a traveling location after the prediction time tp changes in accordance with the travel speed (vehicle speed) V of the own vehicle 1. In this case, by setting the target passing point Pt farther as the speed increases, an appropriate target travel path 3 in accordance with the vehicle speed V can be generated. However, if the vehicle speed V significantly decreases due to traffic congestion or the like, the target passing points Pt are too close to the current location point O, and it becomes difficult to generate an appropriate target travel path 3.

In the examples of FIGS. 2A and 2B, the target travel path 3 is generated to follow a preceding vehicle 4a based on a recognition result of the preceding vehicle 4a, which is traveling on a forward side of the own vehicle 1 in the travel lane 2. In this case, when the preceding vehicle 4a to be followed by the own vehicle 1 moves in a vehicle width direction and the target passing point Pt moves in the vehicle width direction (Pt$_1$ → Pt$_2$), the target travel path 3 is changed and updated, and the own vehicle 1 is controlled to turn along the target travel path 3 that has been updated.

In particular, as illustrated in FIG. 2B, when the own vehicle 1 travels at an extremely low speed (for example, lower than 10 km/h), the prediction distance Xp becomes extremely short, and a change (turning angle θ) in an advancing direction to be necessary for a movement amount of the target passing point Pt is extremely large. Such inconvenience may also occur in a case where neither the left division line 2L nor the right division line 2R is smooth in a traveling scene in which the own vehicle 1 is traveling along the center line 2C of the travel lane 2, as illustrated in FIG. 1.

In the examples of FIGS. 3A and 3B, a vehicle 4b traveling in parallel, which has approached the course of the own vehicle 1 in order to overtake, cut in, pass through, or the like between the own vehicle 1 and the preceding vehicle 4a during traffic congestion, is recognized. In this case, as illustrated in FIG. 3A, when the vehicle 4b traveling in parallel is recognized in a range within the prediction distance Xp, the target travel path 3, which is offset in a direction away from the vehicle 4b traveling in parallel, is generated based on a recognition result in order to mitigate an occupant's uneasy feeling. On the other hand, as illustrated in FIG. 3B, when the vehicle 4b traveling in parallel is recognized in a range exceeding the prediction distance Xp, it is not possible to generate the target travel path 3, in which the vehicle 4b traveling in parallel that has approached the course of the own vehicle 1 is considered.

Hence, in the present embodiment, the path generation apparatus is configured as follows so as to be capable of generating an appropriate target travel path 3 even at a low vehicle speed, by setting an appropriate prediction distance Xp in accordance with the vehicle speed V.

Figure 4:
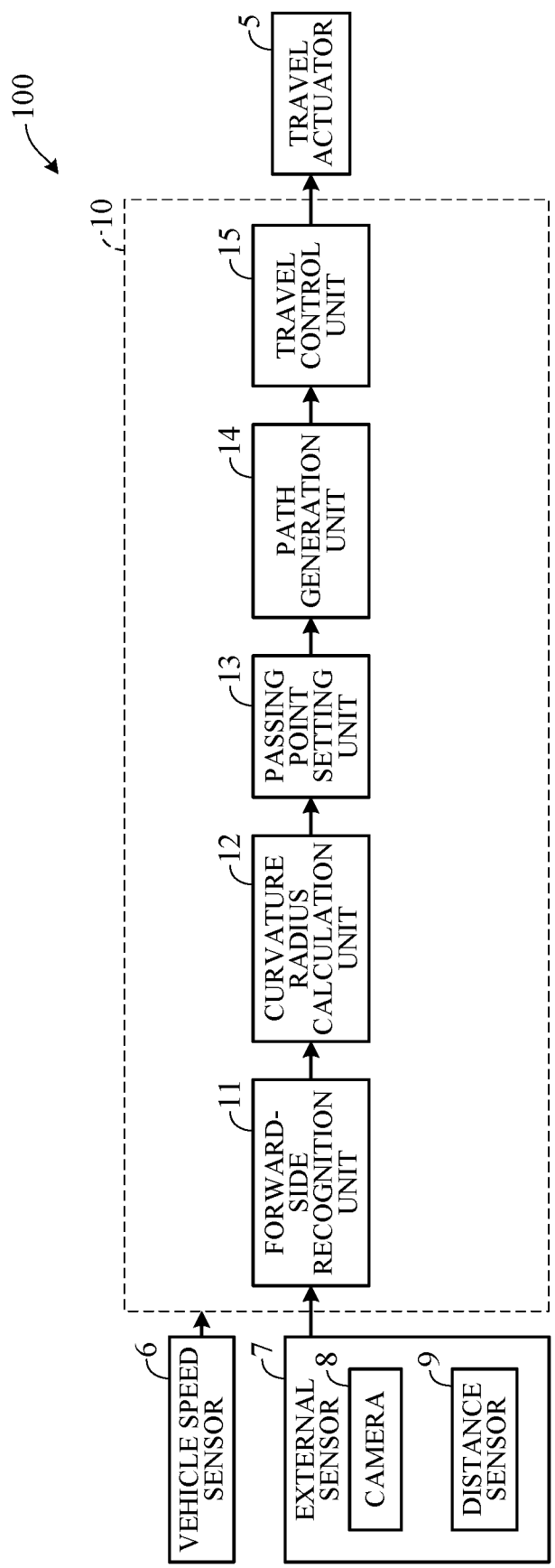
FIG. 4 is a block diagram schematically illustrating an example of a configuration of main components and a processing flow of a path generation apparatus according to an embodiment of the present invention.

FIG. 4 is a block diagram schematically illustrating an example of a configuration of main components and a processing flow of the path generation apparatus (hereinafter, an apparatus) 100 according to an embodiment of the present invention. As illustrated in FIG. 4, the apparatus 100 mainly includes an electronic control unit (ECU) 10. The ECU 10 includes a computer including a (processor) such as a CPU, a storage unit (memory) such as a RAM and a ROM, an I/O interface, and other peripheral circuits. The ECU 10 is configured, for example, as a part of a plurality of ECU groups that are mounted on an own vehicle 1 and that control the operation of the own vehicle 1. The processing of FIG. 4 is started, for example, when the own vehicle 1 starts operating and the ECU 10 is activated, and is repeated at a predetermined cycle.

A travel actuator 5, a vehicle speed sensor 6, and an external sensor 7, which are mounted on the own vehicle 1, are connected with the ECU 10. The travel actuator 5 includes a steering mechanism such as a steering gear that steers the own vehicle 1. The vehicle speed sensor 6 includes, for example, a wheel speed sensor that detects a rotation speed of a wheel, and detects the vehicle speed V.

The external sensor 7 detects an external situation on a forward side of the vehicle with the advancing direction of the own vehicle 1 as the center. The external sensor 7 includes an imaging element such as a CCD or a CMOS, and includes a camera 8, which images a forward side of the own vehicle 1, and a distance sensor 9, which detects an inter-vehicle distance from the own vehicle 1 to the preceding vehicle 4a. The distance sensor 9 includes, for example, a millimeter wave radar that irradiates millimeter waves (radio waves) and measures a distance and a direction to an object by use of a period of time until the irradiated wave hits the object and then returns. The distance sensor 9 may include a light detection and ranging (LiDAR) that irradiates laser light and measures a distance and a direction to an object by use of a period of time until the irradiated light hits the object and then returns.

The ECU 10 includes a forward-side recognition unit 11, a curvature radius calculation unit 12, a passing point setting unit 13, a path generation unit 14, and a travel control unit 15, as functional configurations of an arithmetic unit. Specifically, the arithmetic unit of the ECU 10 functions as the forward-side recognition unit 11, the curvature radius calculation unit 12, the passing point setting unit 13, the path generation unit 14, and the travel control unit 15.

The forward-side recognition unit 11 recognizes a location of a division line, a curbstone, a guardrail, or the like on a road on a forward side of the vehicle with the advancing direction of the own vehicle 1 as the center, based on a signal from the external sensor 7, and thus recognizes the travel lane 2, in which the own vehicle 1 is traveling. In addition, the location of a neighboring vehicle 4 on the road on a forward side of the vehicle with the advancing direction of the own vehicle 1 as the center is also recognized. A typical road shape is designed with a clothoid curve in which the curvature changes at a certain rate, and some sections of the clothoid curve corresponding to the road shape can be approximated by use of a higher-order function such as a cubic function.

Figure 5:
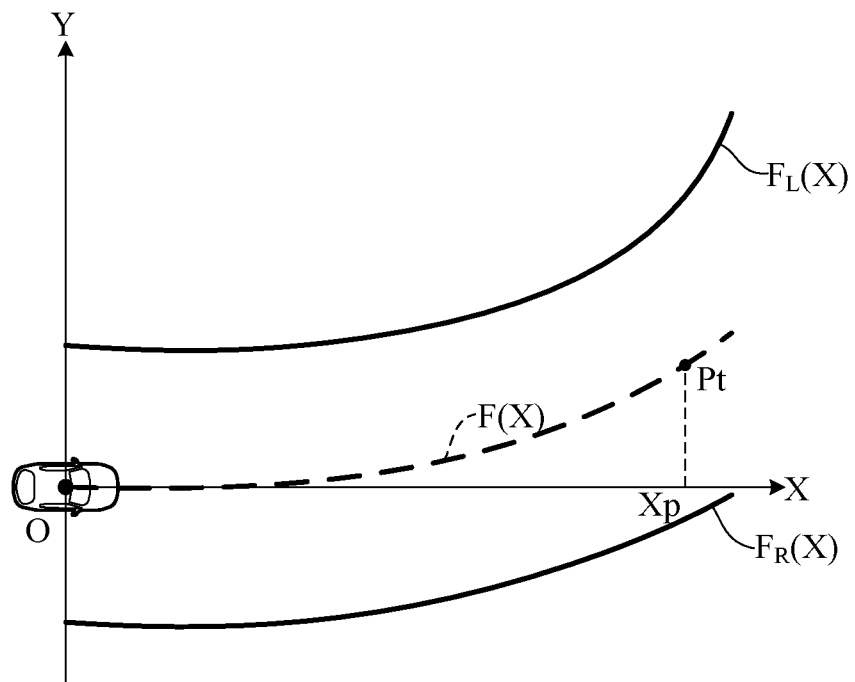
FIG. 5 is a diagram for describing a cubic function representing a center line of a travel lane that has been derived based on a recognition result by a forward-side recognition unit shown in FIG. 4.

FIG. 5 is a diagram for describing a cubic function F(X) representing the center line 2C of the travel lane 2 that has been derived, based on a recognition result by the forward-side recognition unit 11. As illustrated in FIG. 5, by identifying the advancing direction of the own vehicle 1 with respect to the travel lane 2, based on the recognition result by the forward-side recognition unit 11, it is possible to derive the cubic function F(X) representing the center line 2C of the travel lane 2, with the current location point O of the own vehicle 1 as an origin and the identified advancing direction as x-axis. Specifically, the cubic functions $F_L(X)$ and $F_R(X)$ of following Expressions (i) and (ii), which respectively approximate the left and right division lines (or curbstones, guardrails, or the like) 2L and 2R that have been recognized by the forward-side recognition unit 11, are derived by use of a curve fitting method such as a least squares method.

$$F_L(X) = C_{3L}X^3 + C_{2L}X^2 + C_{1L}X + C_{0L} \quad \text{(i)}$$

$$F_R(X) = C_{3R}X^3 + C_{2R}X^2 + C_{1R}X + C_{0R} \quad \text{(ii)}$$

Next, a cubic function F(X) of a following Expression (iii) corresponding to the center line 2C of the travel lane 2 is derived, based on the cubic functions $F_L(X)$ and $F_R(X)$ respectively corresponding to the left and right division lines 2L and 2R.

$$F(X) = C_3X^3 + C_2X^2 + C_1X + C_0 \quad \text{(iii)}$$

$$C_3 = (C_{3L} + C_{3R})/2, C_2 = (C_{2L} + C_{2R})/2$$

$$C_1 = (C_{1L} + C_{1R})/2, C_0 = (C_{0L} + C_{0R})/2$$

The curvature radius calculation unit 12 calculates a curvature radius R of the travel lane 2, in which the own vehicle 1 is traveling. For example, the curvature radius R of the center line 2C in the travel lane 2 in the traveling location that is the prediction distance Xp ahead is calculated by a following Expression (iv).

$$R = \{1 + (3C_3Xp^2 + 2C_2Xp + C_1)^2\}^{1.5}/(6C_3Xp + 2C_2) \quad \text{(iv)}$$

Figure 6:
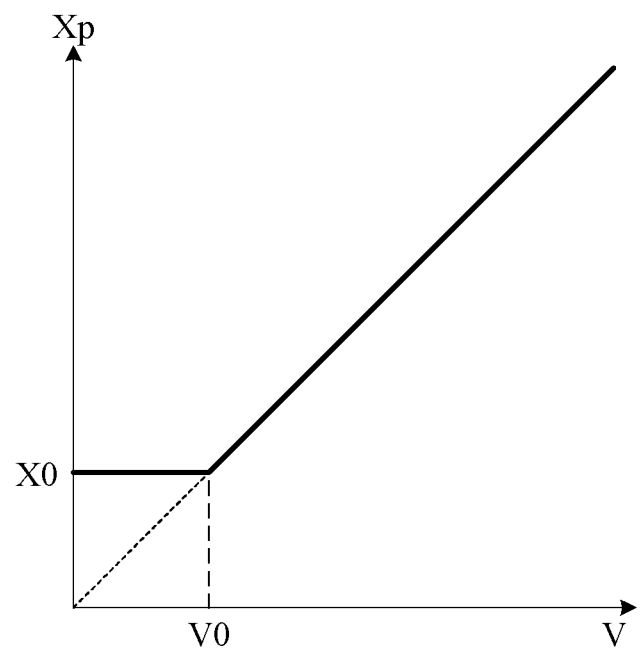
FIG. 6 is a diagram for describing setting of a target passing point by a passing point setting unit shown in FIG. 4.

The passing point setting unit 13 sets the prediction distance Xp, based on the vehicle speed V that has been detected by the vehicle speed sensor 6, and also sets the target passing point Pt to the prediction distance Xp ahead from the current location point O. FIG. 6 is a diagram for describing setting of the target passing point Pt by the passing point setting unit 13, and is a diagram for describing setting of the prediction distance Xp in setting the target passing point Pt.

As illustrated in FIG. 6, in a case where the vehicle speed V that has been detected by the vehicle speed sensor 6 is equal to or higher than a predetermined value V0 (for example, approximately 11.6 km/h), the passing point setting unit 13 sets the distance to the traveling location after a predetermined prediction time tp, as the prediction distance Xp (following Expression (v)). On the other hand, in a case where the vehicle speed V that has been detected by the vehicle speed sensor 6 is lower than the predetermined value V0, the passing point setting unit 13 sets a predetermined distance X0 (for example, approximately ten meters) as the prediction distance Xp (following Expression (vi)).

$$Xp = Vtp (V \geq V0) \quad \text{(v)}$$

$$Xp = X0 (V < V0) \quad \text{(vi)}$$

The predetermined distance X0 is set to an average inter-vehicle distance during traffic congestion, and is set to, for example, about twice the overall length of an average vehicle (for example, approximately five meters). The passing point setting unit 13 may set an actual inter-vehicle distance from the own vehicle 1 to the preceding vehicle 4a that has been detected by the distance sensor 9, as the predetermined distance X0.

The path generation unit 14 generates the target travel path 3 from the current location point O to the target passing point Pt that has been set by the passing point setting unit 13. For example, the target travel path 3 from the current location point O to the target passing point Pt is generated along the center line 2C of the travel lane 2, which is expressed by the cubic function F(X), and which has been derived, based on the recognition result by the forward-side recognition unit 11. In addition, when the vehicle 4b traveling in parallel that has approached the course of the own vehicle 1 is recognized within a range of the prediction distance Xp, the target travel path 3, which is offset in a direction away from the vehicle 4b traveling in parallel, is generated based on the recognition result.

Figure 7:
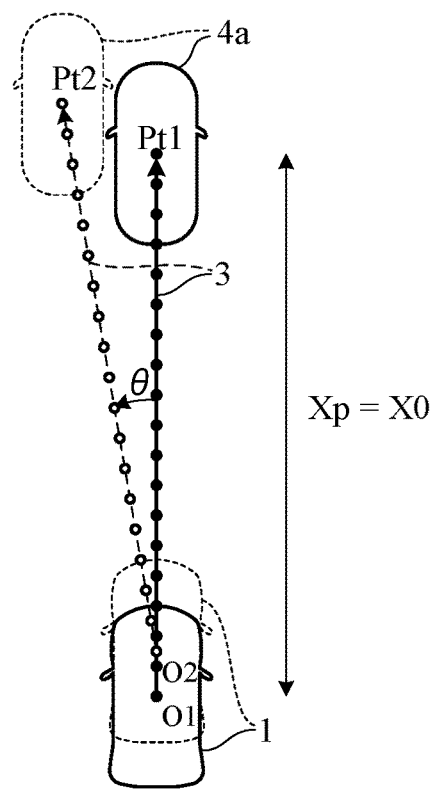
FIG. 7 is a diagram for describing change of the target travel path generated by a path generation unit shown in FIG. 4 during traveling at low speed.

FIG. 7 is a diagram for describing a change of the target travel path 3 generated by the path generation unit 14 during traveling at low speed. Unlike the case of FIG. 2B, the prediction distance Xp of the predetermined distance X0 is ensured even at a low vehicle speed. Therefore, it is possible to generate an appropriate target travel path 3 while suppressing a variation (turn angle θ) in the advancing direction accompanied by a change of the target travel paths 3 leading to the target passing points $Pt_1$ and $Pt_2$.

Figure 8:
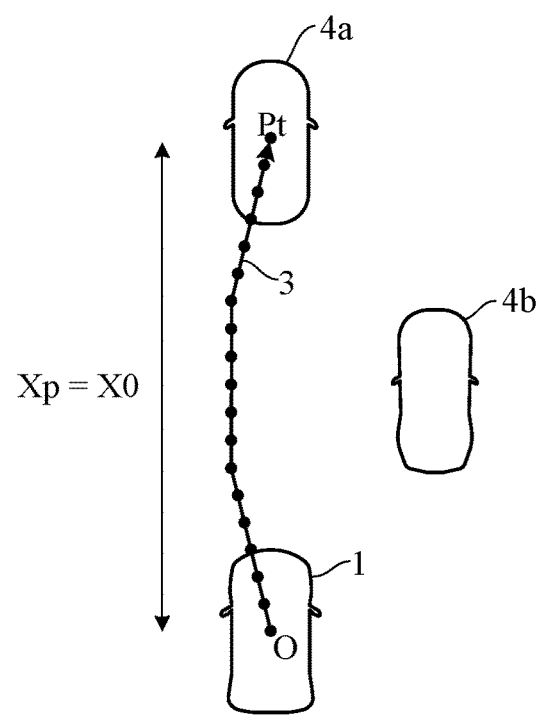
FIG. 8 is a diagram for describing the target travel path to be generated by the path generation unit shown in FIG. 4 during traveling at low speed.

FIG. 8 is a diagram for describing the target travel path 3 to be generated by the path generation unit 14 during traveling at low speed. Unlike the case of FIG. 3B, the prediction distance Xp of the predetermined distance X0 is ensured even at a low vehicle speed. Therefore, it is possible to generate an appropriate target travel path 3 in consideration of the recognition result of the vehicle 4b traveling in parallel or the like and overtaking the own vehicle 1 in a range within the predetermined distance X0 from the own vehicle 1.

Figure 9A:
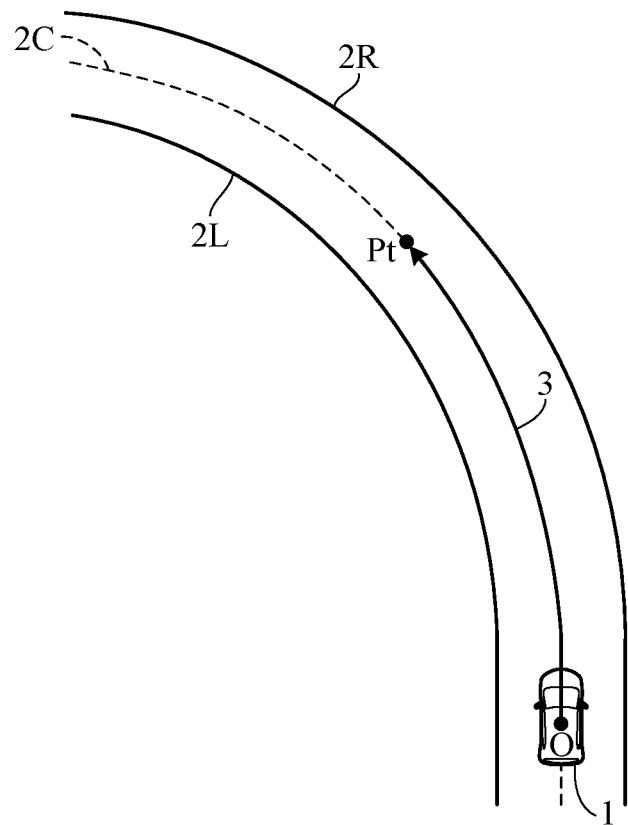
FIG. 9A is a diagram for describing the target travel path to be generated while traveling on a gently curved road.
Figure 9B:
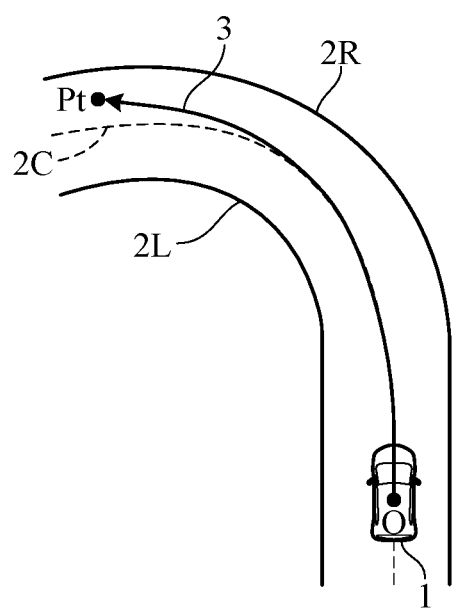
FIG. 9B is a diagram for describing the target travel path to be generated during traveling on a sharp curved road.

FIG. 9A is a diagram for describing the target travel path 3 to be generated while traveling on a gently curved road, and FIG. 9B is a diagram for describing the target travel path 3 to be generated during traveling on a sharp curved road. As illustrated in FIG. 9A, on a gently curved road having a large curvature radius R or a straight road, it is easy to see a forward sight, and it is possible to accurately recognize the travel lane 2 in a traveling location to be the prediction distance Xp ahead that has been set in accordance with the vehicle speed V, and to set an appropriate target passing point Pt. On the other hand, as illustrated in FIG. 9B, in a sharp curved road with a small curvature radius R, it is difficult to see the forward sight, and there is a possibility that it is not possible to accurately recognize the travel lane 2 in the traveling location to be the prediction distance Xp ahead that has been set in accordance with the vehicle speed V, and there is a possibility that it is not possible to set the appropriate target passing point Pt.

For this reason, the passing point setting unit 13 sets the prediction distance Xp, and also sets the target passing point Pt, based on the curvature radius R that has been calculated by the curvature radius calculation unit 12, in addition to the vehicle speed V that has been detected by the vehicle speed sensor 6. More specifically, the prediction distance Xp in setting the target passing point Pt is set, by referring to the characteristics stored beforehand in the storage unit of the ECU 10, based on the vehicle speed V that has been detected by the vehicle speed sensor 6 and the curvature radius R that has been calculated by the curvature radius calculation unit 12.

In this case, the prediction distance Xp for an identical vehicle speed is set within a range in which the travel lane 2 is accurately recognizable in accordance with the curvature radius R. For example, in a case where the curvature radius R is equal to 100 meters, the prediction distance Xp is set to 50 meters, and in a case where the curvature radius R is equal to 2000 meters, the prediction distance Xp is set to 150 meters. By setting the prediction distance Xp leading to the target passing point Pt within a range in which the travel lane 2 is accurately recognizable in accordance with the curvature radius R, the appropriate target travel path 3 can be generated.

The travel control unit 15 controls the travel actuator 5 to conduct driving assistance for the driver of the own vehicle 1 or to automatically drive the own vehicle 1, based on the target travel path 3 that has been generated by the path generation unit 14. This enables the own vehicle 1 to travel along the appropriate target travel path 3 even at a low vehicle speed.

The present embodiment is capable of achieving the following operations and effects.

(1) The apparatus 100 includes: the passing point setting unit 13, which sets a target passing point Pt on the travel lane 2 while the own vehicle 1 is traveling; the path generation unit 14, which generates a target travel path 3 from the current location point O to the target passing point Pt that has been set by the passing point setting unit 13; and the vehicle speed sensor 6, which acquires speed information of the own vehicle 1 (FIG. 4). The passing point setting unit 13 sets the target passing point Pt after the prediction time tp, based on the speed information that has been acquired by the vehicle speed sensor 6, in a case where the vehicle speed V is equal to or higher than the predetermined value V0, whereas the passing point setting unit 13 sets the target passing point Pt to a predetermined distance X0 ahead from the current location point O, in a case where the vehicle speed V is lower than the predetermined value V0 (FIG. 6).

Accordingly, the prediction distance Xp, which is the predetermined distance X0, is ensured even at low vehicle speed. Therefore, it is possible to suppress a variation in the advancing direction accompanied by a change of the target travel path 3 leading to the target passing point Pt, and it is possible to generate an appropriate target travel path 3 (FIG. 2B and FIG. 7). In addition, the appropriate target travel path 3 can be generated in consideration of the recognition result of the vehicle 4b traveling in parallel or the like, and overtaking the own vehicle 1 in a range within a predetermined distance X0 from the own vehicle 1 (FIG. 3B and FIG. 8).

(2) The apparatus 100 further includes the distance sensor 9, which detects an inter-vehicle distance from the own vehicle 1 to the preceding vehicle 4a traveling on a forward side of the own vehicle 1 in the travel lane 2 in which the own vehicle 1 is traveling (FIG. 4). The passing point setting unit 13 sets the inter-vehicle distance that has been detected by the distance sensor 9 as the predetermined distance X0. This enables generation of the appropriate target travel path 3 in reliable consideration of the recognition result of the vehicle 4b traveling in parallel that is to overtake, cut in, pass through, or the like between the own vehicle 1 and the preceding vehicle 4a during traffic congestion (FIG. 3B and FIG. 8).

(3) The apparatus 100 further includes the curvature radius calculation unit 12, which calculates a curvature radius R of the travel lane 2 in which the own vehicle 1 is traveling (FIG. 4). The passing point setting unit 13 further sets the target passing point Pt, based on the curvature radius R that has been calculated by the curvature radius calculation unit 12. Specifically, by setting the prediction distance Xp to the target passing point Pt to a range in which the travel lane 2 is accurately recognizable in accordance with the curvature radius R, an appropriate target travel path 3 can be generated.

(4) The apparatus 100 further includes the travel control unit 15, which controls the travel actuator 5 to conduct driving assistance for the driver of the own vehicle 1 or to automatically drive the own vehicle 1 (FIG. 4). The travel control unit 15 controls the travel actuator 5, based on the target travel path 3 that has been generated by the path generation unit 14. This enables the own vehicle 1 to travel along the appropriate target travel path 3 even at a low vehicle speed.

In the above embodiments, an example in which the vehicle speed V is detected by the vehicle speed sensor 6 such as a wheel speed sensor has been described. However, a speed information acquisition unit that acquires speed information of the own vehicle is not limited to such an example. For example, the vehicle location may be measured, based on a positioning signal from a positioning satellite, and the vehicle speed may be calculated, based on changes in the vehicle location over time.

In the above embodiments, an example in which the apparatus 100 includes the travel control unit 15 has been described. However, the path generation apparatus is not limited to such an example. For example, a display control unit, which controls a display unit such as a head-up display for displaying the target travel path 3 that has been generated by the path generation unit 14 to be superimposed on a road on a forward side of the vehicle, may be included.

In the above embodiments, an example in which the inter-vehicle distance from the own vehicle 1 to the preceding vehicle 4a is detected by use of the distance sensor 9 such as a millimeter wave radar or a light detection and ranging (LiDAR) has been described. However, the inter-vehicle distance from the own vehicle 1 to the preceding vehicle 4a may be detected, based on the image data of a forward side of the vehicle that has been imaged by the camera 8. In this case, the external sensor 7 may be made up of only the camera 8.

The above embodiment can be combined as desired with one or more of the aforesaid modifications. The modifications can also be combined with one another.

According to the present invention, it becomes possible to generate an appropriate target travel path even at a low vehicle speed.

Above, while the present invention has been described with reference to the preferred embodiments thereof, it will be understood, by those skilled in the art, that various changes and modifications may be made thereto without departing from the scope of the appended claims.

The invention claimed is:

1. A path generation apparatus configured to generate a target travel path of an own vehicle traveling in a travel lane, comprising:
   an external sensor mounted on the own vehicle and configured to detect an external situation centered on an advancing direction of the own vehicle;
   a vehicle speed sensor configured to detect a travel speed of the own vehicle; and
   an electronic control unit including a processor and a memory coupled to the processor, wherein
   the electronic control unit is configured to perform:
      setting a target passing point on the travel lane based on the external situation detected by the external sensor;
      identifying the advancing direction with respect to the travel lane; and
      generating a function passing through a current location point of the own vehicle and the target passing point with the current location point as an origin and the advancing direction as an x-axis as the target travel path from the current location point to the target passing point, wherein
   the setting the target passing point includes setting the target passing point so that an x-axis coordinate representing a distance from the current location point to the target passing point in the advancing direction equals a product of the travel speed detected by the vehicle speed sensor and a predetermined time period when the travel speed detected by the vehicle speed sensor is equal to or higher than a predetermined vehicle speed, and setting the target passing point so that the x-axis coordinate equals a predetermined value when the travel speed detected by the vehicle speed sensor is lower than the predetermined vehicle speed.

2. The path generation apparatus according to claim 1, further comprising:
   a distance sensor mounted on the own vehicle and configured to detect an inter-vehicle distance from the own vehicle to a preceding vehicle traveling on a forward side of the own vehicle in the travel lane, wherein
   the setting the target passing point includes setting the inter-vehicle distance detected by the distance sensor as the predetermined value.

3. The path generation apparatus according to claim 1, wherein
   the electronic control unit is further configured to perform:
   calculating a curvature radius of the travel lane based on the external situation detected by the external sensor, wherein
   the setting the target passing point includes setting the target passing point further based on the curvature radius.

4. The path generation apparatus according to claim 1, wherein
   the electronic control unit is further configured to perform:
   controlling a travel actuator to conduct driving assistance for a driver of the own vehicle or to automatically drive the own vehicle, wherein
   the controlling includes controlling the travel actuator based on the target travel path.

5. The path generation apparatus according to claim 1, wherein
   the external sensor includes a camera.

6. The path generation apparatus according to claim 2, wherein
   the distance sensor includes at least one of a camera, a millimeter wave radar, and a LiDAR.

7. A path generation method configured to generate a target travel path of an own vehicle traveling in a travel lane, comprising:
   setting a target passing point on the travel lane based on an external situation centered on an advancing direction of the own vehicle detected by an external sensor mounted on the own vehicle;
   identifying the advancing direction with respect to the travel lane; and
   generating a function passing through a current location point of the own vehicle and the target passing point with the current location point as an origin and the advancing direction as an x-axis as the target travel path from the current location point to the target passing point, wherein
   the setting the target passing point includes setting the target passing point so that an x-axis coordinate representing a distance from the current location point to the target passing point in the advancing direction equals a product of a travel speed of the own vehicle detected by a vehicle speed sensor and a predetermined time period when the travel speed detected by the vehicle speed sensor is equal to or higher than a predetermined vehicle speed, and setting the target passing point so that the x-axis coordinate equals a predetermined value when the travel speed detected by the vehicle speed sensor is lower than the predetermined vehicle speed.

8. The path generation method according to claim 7, wherein
   the setting the target passing point includes setting an inter-vehicle distance from the own vehicle to a preceding vehicle traveling on a forward side of the own vehicle in the travel lane detected by a distance sensor mounted on the own vehicle as the predetermined value.

9. The path generation method according to claim 7, further comprising:
   calculating a curvature radius of the travel lane based on the external situation detected by the external sensor, wherein
   the setting the target passing point includes setting the target passing point further based on the curvature radius.

10. The path generation method according to claim 7, further comprising:
    controlling a travel actuator to conduct driving assistance for a driver of the own vehicle or to automatically drive the own vehicle, wherein
    the controlling includes controlling the travel actuator based on the target travel path.

11. The path generation method according to claim 7, wherein
    the external sensor includes a camera.

12. The path generation method according to claim 8, wherein
    the distance sensor includes at least one of a camera, a millimeter wave radar, and a LiDAR.

* * * * *